United States Patent [19]

Kroggel et al.

[11] Patent Number: 5,559,175
[45] Date of Patent: Sep. 24, 1996

[54] POLYVINYL ACETALS WHICH CAN FORM EMULSIFIER-FREE AQUEOUS DISPERSIONS AND REDISPERSIBLE DRY POWDERS, PROCESSES FOR THEIR PREPARATION AND THEIR USE

[75] Inventors: Matthias Kroggel, Kelkheim; Hermann Schindler, Hofheim, both of Germany

[73] Assignee: Hoechst Aktiengesellschaft, Germany

[21] Appl. No.: 394,418

[22] Filed: Feb. 24, 1995

Related U.S. Application Data

[62] Division of Ser. No. 138,121, Oct. 15, 1993, abandoned.

[30] Foreign Application Priority Data

Oct. 19, 1992 [DE] Germany ............ 42 35 151.0

[51] Int. Cl.⁶ .................. C08K 5/09; C08K 5/12
[52] U.S. Cl. .................. 524/297; 524/284; 524/296; 524/306; 524/308; 524/310; 524/314; 524/315; 524/317; 524/503; 524/557; 525/56; 525/57; 525/58; 525/59; 525/60; 525/61
[58] Field of Search .................. 524/503, 557, 524/284, 297, 296, 308, 306, 310, 314, 316, 317; 525/61, 56, 58, 59, 60, 57

[56] References Cited

U.S. PATENT DOCUMENTS 4,401,836  8/1983  Englhardt et al. .................. 525/61
5,030,688  7/1991  Misra et al. .................. 525/61

Primary Examiner—Judy M. Reddick
Attorney, Agent, or Firm—Bierman & Muserlian

[57] ABSTRACT

Preparation of polyvinyl acetals which can form emulsifier- and surfactant-free aqueous dispersions and redispersible dry powders and contain copolymeric polyvinyl acetals with, in amounts sufficient to form a dispersion, comonomer units carrying sulfo salt groups which are derived from copolymeric polyvinyl alcohol (PVALs) which contained comonomer units carrying sulfonate groups in the salt form. The preparation is carried out by acetalization of the starting polyvinyl alcohols to be used with aldehydes or aldehyde acetals under acid-catalyzed acetalization conditions in an aqueous medium, emulsifier-free stable aqueous polyvinyl acetal dispersions being obtained, from which dry redispersible polyvinyl acetal powders can be obtained by spray drying or freeze drying. The polyvinyl acetals according to the invention can be plasticized by mixing in plasticizers both in their aqueous dispersion form and in the dry powder form. The polyvinyl acetals according to the invention can be employed, both in the aqueous dispersion form and in the dry powder form, in numerous fields of use where polyvinyl acetals of the type known to date are already usually used. Moreover, because of the advantageous spectrum of properties of polyvinyl acetals according to the invention, numerous new fields of use are accessible.

14 Claims, No Drawings

POLYVINYL ACETALS WHICH CAN FORM EMULSIFIER-FREE AQUEOUS DISPERSIONS AND REDISPERSIBLE DRY POWDERS, PROCESSES FOR THEIR PREPARATION AND THEIR USE

This application is a continuation of U.S. patent application Ser. No. 138,121 filed Oct. 15, 1993, now abandoned.

The invention relates to polyvinyl acetals which can form emulsifier- and surfactant-free aqueous dispersions and redispersible dry powders and are prepared from copolymeric polyvinyl alcohols (PVALs), which have contents of comonomer units carrying sulfo salt groups which are sufficient to form a dispersion, in aqueous solution by reaction with aldehydes under acid-catalyzed acetalization conditions in the absence of low molecular weight emulsifiers or surfactants to form stable aqueous polyvinyl acetal dispersions and, if appropriate, removal of the water content from the dispersions by spray drying or freeze drying and isolation of the polymer content of the dispersions in a dry, redispersible powder form, processes for the preparation of the polyvinyl acetals and their aqueous emulsifier-free dispersions and their use either in the aqueous dispersion form or in the dry redispersible powder form.

As is known, polyvinyl acetals are employed for numerous uses, for example for the production of films, as binders in coating resins, as binders in photographic printing plates, as binder resins in printing inks and corrosion protection varnishes, as protective sheathing for electric cables and as a barrier layer material in paper finishing. Polyvinyl acetals are employed for these applications either in bulk, for example as a melt, if appropriate in plasticized, plasticizer-containing form, or in the form of aqueous dispersions or in the form of solutions in organic solvents. For reasons of environmental pollution, toxicity and the risk of fire, in particular, attempts have recently been made to an increasing extent to replace systems comprising organic solvents, if possible from the formulation aspect, by aqueous systems, so that aqueous polyvinyl acetal dispersions are increasingly gaining importance.

The preparation of aqueous polyvinyl acetal dispersions is known to be expensive, since as a rule it is carried out in the form of secondary dispersions, pulverulent polyvinyl acetals being mixed or kneaded, for example, with large amounts of emulsifier and the mixtures being dispersed in water, if appropriate co-using organic solvents.

The emulsifiers used for the preparation of secondary dispersions are usually known low molecular weight surface-active compounds. Their co-use results in the fact that, inter alia, the low molecular weight constituents can easily be dissolved out of the polyvinyl acetal films produced from such dispersions of high emulsifier content by contact with other substances, such as, for example, water or organic solvents, in the course of time, leading to a progressive change in the properties of the film.

Emulsifier-free polyvinyl acetal dispersions which can be obtained by acetalization of grafted polyvinyl alcohols are known from DE-A 3,246,605. The grafted PVALs on which the products here are based are compounds in which the PVAL groups are grafted onto a polyethylene glycol graft base. They can be prepared by grafting polymerization, initiated by free radicals, of vinyl acetate onto polyethylene glycol molecules and subsequent conversion of the grafted-on polyvinyl acetate groups to PVAL groups by hydrolysis. The synthesis of PVALs grafted onto polyethylene glycol is expensive, inter alia, and is not easily reproducible on an industrial scale. Furthermore, films produced from the grafted polyvinyl acetals are more highly hydrophilic and therefore more sensitive to water than comparable non-grafted polyvinyl acetal films.

The present invention was thus based on the object of providing emulsifier- and surfactant-free aqueous polyvinyl acetal dispersions which do not have the disadvantages described above and which moreover are obtainable with a good reproducibility by inexpensive methods.

It has now been found that, surprisingly, polyvinyl acetals which can form stable aqueous dispersions can be obtained in aqueous dispersion form or, by drying the dispersions, in powder form if copolymeric polyvinyl alcohols which contain the required amount of comonomer units carrying sulfonate groups in their salt form are reacted under acetalization conditions, in aqueous solution by themselves or as a mixture with conventional polyvinyl alcohols which are free from sulfonate groups, with aldehydes or aldehyde acetals in the presence of acid catalysts, it being possible for stable, finely divided aqueous polyvinyl acetal dispersions which contain no low molecular weight emulsifiers or surfactants to be obtained.

The $—SO_3^-$ content from the required content of sulfonate groups in the copolymeric starting PVALs on which the products are based or mixtures thereof with PVALs which are free from sulfonate groups should preferably be at least 1.5% by weight of $—SO_3^-$, based on the weight of anhydrous copolymeric starting PVAL carrying sulfonate groups, or anhydrous mixtures thereof with PVALs which are free from sulfonate groups.

The $—SO_3^-$ content from the comonomer units carrying sulfonate groups in the copolymeric starting PVALs or mixtures thereof with PVALs which are free from sulfonate groups should particularly preferably be 2.5 to 8% by weight of $—SO_3^-$, in particular 3 to 7% by weight of $—SO_3^-$, based on the weight of the anhydrous copolymeric PVAL carrying sulfonate groups, or anhydrous mixtures thereof with PVALs which are free from sulfonate groups.

Preferred salts of the copolymeric starting PVALs carrying sulfonate groups are those with mono- or polyvalent cations which are capable of dissociation, in particular the alkali metal and ammonium salts, and also the alkaline earth metal salts and amine salts. If appropriate, trivalent metal cations can be of interest or advantage in some cases. The sodium, potassium and ammonium salts and, in some cases, also the calcium and magnesium salts are particularly preferred.

It has furthermore been found that aqueous polyvinyl acetal dispersions can be obtained by acetalization of copolymeric PVALs which contain comonomer units carrying sulfonate groups in aqueous media only if the sulfonate groups of the copolymeric PVALs are present during the acetalization in a salt form which is capable of dissociation, preferably with monovalent cations, in particular alkali metal or ammonium salts, and preferably in certain proportions. On the other hand, if the sulfonate groups of the copolymeric PVALs are present during the acetalization reaction, for example, in their free acid form, instead of in the salt form, the polyvinyl acetal formed is not obtained in a stable aqueous dispersion form.

The acetalization of copolymeric PVALs which contain 1 to 35% by weight, based on the PVAL, of free sulfonic acid groups bonded to comonomer units, the sulfonic acid groups acting as an acid catalyst during the acetalization reaction, is known from DD Patent 222,882 A1. In the process described, salt-free polyvinyl acetals which have free sulfonic acid groups and are obtained as copolymeric solids and can subsequently be neutralized are obtained. Modified polyvinyl acetals can be prepared in water-soluble, gelatinous or granular form by the process described. However, the preparation or a possibility of preparation of corresponding aqueous polyvinyl acetal dispersions is neither mentioned nor indicated. Furthermore, polyvinyl acetals with free sulfonic acid groups are unstable and, under the catalytic action of acids, split off at a faster or slower rate the aldehyde bonded during the acetalization, it being possible for the aldehyde split off to be oxidized by the action of atmospheric oxygen to the acid, which in turn can again catalyze and accelerate the deacetalization process.

The invention therefore relates to polyvinyl acetals which can form emulsifier-free aqueous dispersions, and to their aqueous emulsifier-free dispersions, prepared by acetalization of polyvinyl alcohols (PVALs) with aldehydes or aldehyde acetals under acid-catalyzed acetalization conditions, which comprise copolymeric polyvinyl acetals with comonomer units, in contents sufficient to form a dispersion, which carry sulfo salt groups and are derived from copolymeric polyvinyl alcohols (PVALs) which contained the comonomer units carrying sulfonate groups in the salt form.

Polyvinyl acetals in which the sulfonate groups are in the form of their alkali metal or ammonium or amine salts are preferred. In some cases, the alkaline earth metal salts may also be advantageous.

Polyvinyl acetals in which the $-SO_3^-$ content from the sulfo salt groups in the copolymeric starting PVALs on which the products are based or mixtures thereof with PVALs which are free from sulfo salt groups was at least 1.5% by weight of $-SO_3^-$, preferably 2.5 to 8% by weight of $-SO_3^-$, in particular 3 to 7% by weight of $-SO_3^-$, based on the weight of the anhydrous copolymeric starting PVAL containing sulfo salt groups or anhydrous mixtures thereof with PVALs which are free from sulfo salt groups, furthermore are preferred.

Furthermore, polyvinyl acetals in which the copolymeric starting PVALs containing sulfo salt groups on which the products are based contained monomer units of vinylsulfonates, preferably in an amount of 310 to 2500 μmol, in particular 375 to 1800 μmol, per g of anhydrous starting PVAL containing sulfo salt groups, or anhydrous mixtures thereof with PVALs which are free from sulfo salt groups, are preferred.

Polyvinyl acetals based on starting PVALs with lower or higher comonomeric sulfo salt group contents from those stated above can also be prepared. On acetalization of such starting PVALs, however, only unstable dispersions or non-dispersible solids are formed if the comonomeric sulfo salt group contents are too low and if no additional active emulsifier is present in the reaction mixture, or highly viscous creamy compositions or aqueous polyvinyl acetal solutions are formed if the comonomeric sulfo salt group contents are too high. The starting PVALs containing sulfo salt groups which are preferably used according to the invention for the acetalization and acetalizable mixtures thereof with PVALs which are free from sulfo salt groups should therefore have an $-SO_3^-$ content, which can be determined by means of SCD measurement (streaming current detector) at pH 7 in 1% strength aqueous solution, of preferably 310 to 2500 μmol/g of anhydrous PVAL or PVAL mixture, in particular 375 to 1800 μmol/g of anhydrous PVAL or PVAL mixture. The starting PVALs containing sulfo salt groups are obtainable, for example, by copolymerization, initiated by free radicals, of vinyl acetate and Na ethenesulfonate in alcoholic-aqueous solution and subsequent hydrolysis of the resulting copolymers. Preferably up to 10 mol % of other ethylenically unsaturated and copolymerizable comonomers can additionally be co-used during the copolymerization of vinyl acetate and Na ethenesulfonate, whereby the acetalizable starting PVALs obtainable from the copolymers and containing sulfo salt groups and the polyvinyl acetals prepared therefrom can be further varied or modified in their spectrum of properties.

The starting PVALs containing sulfo salt groups on which the polyvinyl acetals according to the invention are based are preferably prepared by hydrolysis or alcoholysis of copolymeric hydrolyzable polyvinyl esters which contain comonomer units carrying sulfonate groups or, if appropriate, mixtures thereof with hydrolyzable polyvinyl esters which are free from sulfonate groups. The hydrolysis of the polyvinyl esters is preferably carried out at degrees of hydrolysis of at least 70 mol %, in particular up to 100 mol %, particularly preferably 84 to 99 mol %, based on the number of moles of hydrolyzable vinyl ester units in the starting polyvinyl esters. The latter preferably contain vinyl ester monomer units having 3 to 20 carbon atoms, in particular vinyl acetate units or comonomeric ethylene/vinyl acetate units.

The viscosity or the molecular weight, which can be determined therefrom, of the resulting starting PVALs containing sulfo salt groups is not critical and can vary within a wide range. The viscosity of the 4% strength by weight aqueous starting PVAL solutions is preferably in the range from 2 to 100 cP, in particular 2 to 70 cP, particularly preferably 3 to 60 cP, determined in a Höppler viscometer in accordance with DIN 53015 at 20° C.

The molecular weight of the starting PVALs carrying sulfo salt groups which are used according to the invention or of mixtures thereof with PVALs which are free from sulfo salt groups is preferably in the range from 1000 to 300,000 g/mol, in particular 2500 to 175,000 g/mol, determined by the customary methods known from the literature.

The polyvinyl acetals according to the invention can furthermore be based on those copolymeric starting PVALs containing sulfo salt groups, or mixtures thereof with PVALs which are free from sulfo salt groups, which have been obtained by hydrolysis or alcoholysis of hydrolyzable copolymeric polyvinyl esters which additionally contained up to a total of 10 mol %, preferably 0.1 to 6 mol %, based on the copolymeric starting polyvinyl esters, of other comonomer units, preferably from the group comprising copolymerizable ethylenically unsaturated ($C_3$–$C_{18}$) carboxylic acids or dicarboxylic acids or anhydrides thereof, acrylic acid ($C_1$–$C_{18}$) esters, methacrylic acid ($C_1$–$C_{18}$) esters, ($C_2$–$C_8$)-α-olefins, other further vinyl ($C_1$–$C_{18}$) carboxylic acid esters, ethylenically unsaturated ($C_3$–$C_{18}$) carboxylic acid amides or nitriles, vinyl halides, vinylidene halides, styrene, vinylalkylbenzenes, optionally alkyl-substituted vinylpyridines or vinylpyrrolidones.

Preferred comonomer units are maleic anhydride and maleic acid, preferably in amounts of 1 to 3 mol %.

The content of vinyl alcohol units in the starting PVALs containing sulfo salt groups on which the polyvinyl acetals according to the invention are based, or mixtures thereof with starting PVALs which are free from sulfo salt groups, is preferably more than 70 mol %, based on the total number of moles of all the monomer units in the starting PVAL.

The content of non-acetalized vinyl alcohol units in the polyvinyl acetals according to the invention is preferably 15 to 35% by weight, in particular 18 to 28% by weight, based on the polyvinyl acetal.

Starting PVALs which are free from sulfo salt groups and are preferably suitable for mixtures have a degree of hydrolysis of more than 70 mol %, preferably more than 84 mol %, based on the hydrolyzable vinyl ester monomer units contained in the starting polyvinyl ester. Starting PVALs which are free from sulfo salt groups and are particularly preferred for mixtures have a degree of hydrolysis of between 86 and 99 mol % and a viscosity of their 4% strength by weight aqueous solutions of preferably between 2 and 70 cP, in particular 3 and 60 cP, determined in a Höppler viscometer in accordance with DIN 53015 at 20° C. The content of PVAL containing sulfo salt groups in mixtures of starting PVALs containing sulfo salt groups with starting PVALs which are free from sulfo salt groups should preferably be more than 25% by weight, in particular more than 50% by weight, based on the PVAL starting mixture.

To prepare polyvinyl acetal dispersions according to the invention, the PVAL containing sulfo salt groups which is to be acetalized, or mixtures thereof with PVALs which are free from sulfo salt groups, are dissolved in water and the PVAL or PVAL mixture is reacted with aldehydes to give the corresponding acetal under catalysis by acids. The synthesis here can be carried out at appropriate temperatures by processes which are known from the literature, either in the form of a metering process or in the form of a batch process. Suitable acid catalysts are in principle all the acids which can be employed for the synthesis of the polyvinyl acetals known to date, for example strong mineral acids, such as, for example, hydrochloric acid, sulfuric acid, phosphoric acid, nitric acid and the like; however, strong organic acids, such as, for example, toluenesulfonic acids, chloroacetic acid, trifluoroacetic acid and the like, can also be used. The acids are preferably employed in an amount of up to 110 mol % of protons, based on the molar amount of aldehyde groups employed for the acetalization, and amounts of 0.5 to 30 mol % of potentially present protons are particularly preferred. In principle, all the aldehydes such as are used for the synthesis of the polyvinyl acetals which are known to date are suitable for the acetalization, such as, for example, aliphatic aldehydes, preferably those having 1 to 20 carbon atoms, in particular formaldehyde, acetaldehyde, propionaldehyde, butyraldehyde, isononanaldehyde and the like, aromatic aldehydes and substituted aromatic aldehydes having 6 to 20 carbon atoms, such as, for example, benzaldehyde, and cycloaliphatic aldehydes having 6 to 20 carbon atoms, such as, for example, cyclohexanecarbaldehyde. Furthermore, derivatives of these aldehydes, such as, for example, halogen, hydroxyl and alkoxy derivatives, can also be employed. Butyraldehydes, in particular n-butyraldehyde, are preferred. Formaldehyde, acetaldehyde, benzaldehyde and cyclohexanecarbaldehyde are also preferred.

Depending on the degree of acetalization aimed for, which can preferably be up to 86 mol %, based on the total number of moles of acetalizable vinyl alcohol units in the starting PVAL, the aldehydes are therefore employed in amounts of preferably up to 43 mol %, based on half the total number of moles of the acetalizable vinyl alcohol units, it being possible for an excess of up to 10 mol % of aldehyde to be necessary and advantageous. Polyvinyl acetals having a degree of acetalization, based on the total number of moles of acetalizable vinyl alcohol units, of between 50 and 86 mol %, in particular between 60 and 80 mol %, are preferred. The use of polyfunctionally crosslinking $(C_3-C_{10})$-dialdehydes, preferably $(C_3-C_6)$-dialdehydes, such as, for example, glutaraldehyde, malodialdehyde, adipodialdehyde or succindialdehyde, may also be of advantage. If polyfunctional aldehydes are employed as crosslinking agents, the amount of crosslinking agent employed should not exceed the value of two aldehyde groups per 300 mol of vinyl alcohol units. An amount of up to two aldehyde groups per 1000 mol of vinyl alcohol units is preferred.

The concentration of the aqueous PVAL solutions to be acetalized should be below 40% by weight of starting PVAL, preferably below 30% by weight of PVAL. The maximum possible concentration of the PVAL solutions of course depends on the nature of the PVAL, and in particular on its molecular weight. The case may accordingly arise where only solutions of a few % strength by weight can be prepared from PVALs having a very high molecular weight.

The acetalization of the PVAL is preferably carried out at temperatures of between 0° and 90° C., in particular between 2° and 70° C. It is advantageous here to start the reaction at temperatures below 20° C. and to bring it to completion at higher temperatures after all the components have been brought together. To avoid coagulation of the polymer dispersions formed according to the invention, the reaction mixture should be heated to higher temperatures only slowly.

The polyvinyl acetal dispersions formed preferably have solids contents of up to 60% by weight, preferably 5 to 40% by weight, depending on the concentration of the PVAL starting solution employed for the acetalization and depending on the degree of acetalization. If PVAL solutions of low concentration are employed, dispersion solids contents in the upper range cannot be achieved immediately. In these cases, however, there is in principle the possibility of following the preparation of a dispersion according to the invention with a second reaction cycle in which polyvinyl alcohol is dissolved again in the dispersion and then acetalized under the abovementioned conditions. If appropriate, this procedure can be repeated several times or, for example, can be carried out continuously in a cascade acetalization apparatus. Polyvinyl acetal dispersions having high solids contents are also obtainable from PVALs of very high molecular weight by this route. Alternatively, the solids content of polyvinyl acetal dispersions of low concentration can be increased by distilling off water, preferably under reduced pressure. The dispersions can also be concentrated by means of ultrafiltration, which is particularly preferred. The average particle size of the polymer particles in the aqueous polyvinyl acetal dispersions according to the invention is preferably between 0.1 and 3 μm, in particular between 0.3 and 1.5 μm, particularly preferably between 0.5 and 1.1 μm.

The polymer content in the aqueous polyvinyl acetal dispersions according to the invention can be isolated according to the invention as a solid by removing the water. The isolation of the solid products in anhydrous powder form can advantageously be carried out by freeze drying or, in particular, by spray drying the aqueous dispersions. The dispersion powders obtainable by this route are redispersible according to the invention in aqueous media.

The polyvinyl acetal dispersions according to the invention and also the polyvinyl acetate powders according to the invention can in principle be plasticized with all the plasticizers and plasticizer mixtures which are compatible with known polyvinyl acetals. A list of commercially available plasticizers, which contains data on their compatibility with, for example, polyvinyl butyral can be found in the publication Modern Plastics Encyclopedia 1981/1982, pages 710–719. Examples of particularly suitable plasticizers are the diesters of aliphatic diols with aliphatic carboxylic acids, in particular diesters of di-, tri- and tetraethylene glycol with aliphatic carboxylic acids having 6 to 10 carbon atoms, for example 2-ethylbutyric acid or n-heptanoic acid, and furthermore diesters of dicarboxylic acids, such as adipic, sebacic or phthalic acid, with aliphatic $(C_4-C_{10})$-alcohols, in particular di-hexyl adipate and dioctyl adipate, and furthermore esters of long-chain fatty acids having up to 40 carbon atoms, in particular ricinoleic acid esters and oleic acid esters.

The plasticizers can be employed in the customary amounts of up to 40% by weight, preferably up to 30% by weight, based on the polymer content of the dispersion or on the anhydrous polymer powder. They can be admixed either to the aqueous dispersions or to the dry polymer powders.

The aqueous polyvinyl acetal dispersions and the polyvinyl acetal powders obtained therefrom by removal of water furthermore can be mixed with fillers, pigments, resins, water-miscible solvents, aqueous dispersions of plastics, crosslinking agents, film-forming agents, stabilizers and the like.

The polyvinyl acetal dispersions according to the invention have minimum film-forming temperatures (MFT) of up to 70° C. The minimum film-forming temperature (MFT) can be lowered and adjusted to minimum film-forming temperatures (MFT) of between 0° and 70° C. by addition of plasticizers or customary solvents or film-forming auxiliaries, preferably water-miscible solvents, such as, for example, methanol, ethanol, propanol, butanol or butyldiglycol acetate, to the aqueous dispersions. Water-resistant films or films having a greater or lesser water-solubility are formed, depending on the type of film formation. Thus, for example, when forming films from aqueous dispersions which are free from film-forming auxiliaries under the influence of heat or when forming films from dispersions using solvents, films which are more water-resistant than those obtained by film formation using plasticizers are as a rule obtained.

The invention therefore furthermore relates to a process for the preparation of polyvinyl acetals which can form emulsifier-free aqueous dispersions and their aqueous emulsifier-free dispersions by acetalization of polyvinyl alcohols (PVALs) which contain, in amounts sufficient to form a dispersion, comonomer units carrying sulfo salt groups, with aldehydes or aldehyde acetals under acid-catalyzed acetalization conditions in an aqueous medium and formation of stable aqueous polyvinyl acetal dispersions which contain no low molecular weight emulsifiers or surfactants and can have solids contents of preferably up to 60% by weight, in particular 5 to by weight, based on the aqueous dispersion.

The invention furthermore relates to a process for the preparation of dry, pulverulent polyvinyl acetals, which can be redispersed in water, by removal of the water content from the emulsifier- and surfactant-free aqueous polyvinyl acetal dispersions according to the invention described above, preferably by freeze drying, and particularly preferably by spray drying.

The emulsifier- and surfactant-free aqueous polyvinyl acetal dispersions according to the invention are particularly preferred.

Fillers, pigments, dyestuffs, solvents, plasticizers, other dispersions of plastics, resins, film-forming auxiliaries, light stabilizers, crosslinking agents and, if appropriate, also emulsifiers, protective colloids and other customary additives can be admixed to the aqueous polyvinyl acetal dispersions according to the invention. Films can in principle be obtained from the aqueous polyvinyl acetal dispersions according to the invention above their particular minimum film-forming temperature (MFT), and the dispersions can form useful films and coatings which can have surprisingly advantageous properties compared with films and coatings of known polyvinyl acetal dispersions. Below the MFT of the aqueous dispersions, it is also possible to produce coatings from finely divided polymer particles which, after drying of the aqueous layers of dispersion applied and heating of the dried layers comprising pulverulent polymer particles to temperatures above the glass transition temperature ($T_G$) of the polyvinyl acetal, can form cohesive dense surface coatings or films which display a very good adhesion, for example to metallic substrates, and if appropriate, if crosslinking agent components are also used, can be converted into firmly adhering insoluble coatings or films by stoving at elevated temperatures. Owing to their good adhesion to various materials, in particular to glass and to metals, the polyvinyl acetals according to the invention can have diverse uses as coating compositions.

Polyvinyl butyral dispersions according to the invention and the dry, water-redispersible polyvinyl butyral powders according to the invention obtained from the dispersions are particularly preferred. The latter and also other polyvinyl acetal powders according to the invention can advantageously also be used as binder components in non-aqueous coating formulations based on organic solvents, and if appropriate also as a corrosion protection component for metals, if the polyvinyl acetal powders are soluble in the desired organic solvent medium. Polyvinyl acetals according to the invention are preferably used here in the form of their ammonium or amine salts.

The polyvinyl acetal powders according to the invention are also suitable for powder coating of heated solid substrates, preferably of metals.

Aqueous polyvinyl acetal dispersions according to the invention and dry polyvinyl acetal powders according to the invention obtained therefrom can advantageously be used, inter alia, for the production of varnishes, pigment binders, paints, deep primers for consolidation of porous substrates, adhesives, hot melt adhesives, printing ink binders, photosensitive layers, photographic printing plates, photoresists and films. The aqueous dispersions furthermore can advantageously be used for impregnating textiles, for sizing paper and for finishing paper. They can furthermore be employed in numerous fields of use where polyvinyl acetals of the type known to date are usually used, if appropriate in combination with known polyvinyl acetals, which may be advantageous for some uses.

The invention therefore also furthermore relates to the use described above of aqueous polyvinyl acetal dispersions according to the invention and of the dry and redispersible polyvinyl acetal powders prepared from the latter by elimination of water, preferably as a constituent of coating compositions for various substrates, preferably for glass and metals, as a binder for pigments, for the production of printing inks, of photosensitive layers, of photographic printing plates and photoresists, of hot melt adhesives, of films, of solvent-containing or aqueous adhesives, of deep primers for compaction of porous substrates, preferably wood, masonry, plaster, molded bricks and concrete, and of varnish formulations, if appropriate also using crosslinking agents, for gluing various materials, such as metals, ceramic materials, plastics, fibers, films, textiles, paper and wood, for the production of shaped articles and films by thermoplastic shaping, as a material for shaped articles which can be processed thermoplastically, as intermediate film layers in the production of laminated glasses, and as binders in synthetic resins plasters, stopping compositions and construction adhesives, preferably in dry, pulverulent formulations which can be made up or dispersed with water.

The invention is illustrated in more detail by the following examples.

EXAMPLES

Preparation of Aqueous Emulsifier- and Surfactant-free Polyvinyl Acetal Dispersions

Example 1

1400 g of a polyvinyl alcohol containing ethylenesulfonate units, prepared by hydrolysis of a vinyl acetate/ ethenesulfonate copolymer, (degree of hydrolysis: 97.5%, Na ethenesulfonate content: 5.2% by weight (=3.2% by weight of $SO_3^-$), viscosity of the 4% strength by weight aqueous solution at 20° C.: 5.7 cP) are dissolved in 5600 g of water at 90° C. under an $N_2$ atmosphere in a reaction vessel with a stirrer and reflux condenser. The solution is then cooled to 1° C., 37.28 g of 85% strength by weight phosphoric acid are added and 780.85 g of n-butyraldehyde are metered in over a period of 2 hours such that the temperature of the mixture does not exceed 2.5° C. The mixture is then warmed to 30° C. in the course of 3 hours and the reaction mixture is subsequently allowed to after-react at 30° C. for 2 hours. The mixture is then brought to a pH of 6.5 by addition of aqueous NaOH. The stable aqueous dispersion of plastic thereby obtained has a solids content of 25.5% by weight and a viscosity of 12.4 cP (determined in a rotary viscometer[6] at 20° C. and a shear rate of 386.6 $s^{-1}$). The average particle diameter of the dispersion is 0.8 $\mu m^{5)}$. The minimum film-forming temperature (MFT) of the dispersion is above 50° C. The dispersion contains no low molecular weight emulsifiers or surfactants.

[5] Determined by argon/xenon laser aerosol spectroscopy.
[6] Rotary viscometer from Haake, type VT 500.

A portion of the polyvinyl butyral obtained in the form of a dispersion is isolated in the form of a colorless powder by freeze drying an aliquot portion of the dispersion. The powder comprises divinyl butyral units[2] to the extent of 77.5% by weight, vinyl alcohol units[1] to the extent of 17.3% by weight, Na ethenesulfonate units[3] to the extent of 3.7% by weight and vinyl acetate units[4] to the extent of 1.5% by weight. The viscosity of the 10% strength by weight ethanolic polyvinyl butyral solution prepared from the pulverulent polymer is 130.9 cP (determined in a Höppler viscometer in accordance with DIN 53015 at 20° C.).

[1] [2] [3] Calculated by means of the $SO_3^-$ content of the starting polyvinyl alcohols and the residual vinyl acetate content of the acetals determined by analysis, assuming a 100% aldehyde conversion. (The residual butyraldehyde content of the dispersion was determined as <0.2% by weight in all cases by means of gas chromatography analysis (GC)).
[4] Determined by hydrolysis of the vinyl acetate units with excess alkali and back-titration.

The pulverulent product is redispersible in water to form a stable aqueous dispersion.

Example 2

289.16 g of a polyvinyl alcohol containing ethenesulfonate units, prepared by hydrolysis of a vinyl acetate/ ethenesulfonate copolymer, (degree of hydrolysis: 97.1%, Na ethenesulfonate content: 5.2% by weight (=3.2% by weight of $SO_3^-$), viscosity of the 4% strength by weight aqueous solution at 20° C.: 5.7 cP) are dissolved in 903.24 g of water at 90° C. under an $N_2$ atmosphere in a reaction vessel with a stirrer and reflux condenser. The solution is then cooled to 1° C., 7.7 g of 85% strength by weight phosphoric acid are added and 149 g of n-butyraldehyde are metered in over a period of 2 hours such that the temperature of the mixture does not exceed 2.5° C. The mixture is then warmed to 30° C. in the course of 3 hours and the reaction mixture is subsequently allowed to after-react at 30° C. for 2 hours. The mixture is then brought to a pH of 6.5 by addition of aqueous NaOH. The stable aqueous dispersion of plastic thereby obtained has a solids content of 29.1% by weight. The average particle diameter of the dispersion is 1.3 $\mu m^{5)}$. The minimum film-forming temperature (MFT) of the dispersion is above 50° C. The dispersion contains no low molecular weight emulsifiers or surfactants.

[5] Determined by argon/xenon laser aerosol spectroscopy.

A portion of the polyvinyl butyral obtained in the form of a dispersion is isolated in the form of a colorless powder by freeze drying an aliquot portion of the dispersion. The powder comprises divinyl butyral units[2] to the extent of 73.2% by weight, vinyl alcohol units[1] to the extent of 21.4% by weight, Na ethenesulfonate units[3] to the extent of 3.8% by weight and vinyl acetate units[4] to the extent of 1.6% by weight.

[1] [2] [3] Calculated by means of the $SO_3^-$ content of the starting polyvinyl alcohols and the residual vinyl acetate content of the acetals determined by analysis, assuming a 100% aldehyde conversion. (The residual butyraldehyde content of the dispersion was determined as <0.2% by weight in all cases by means of gas chromatography analysis (GC)).
[4] Determined by hydrolysis of the vinyl acetate units with excess alkali and back-titration.

The pulverulent product is redispersible in water to form a stable aqueous dispersion.

Example 3

140 g of a polyvinyl alcohol containing ethenesulfonate units, prepared by hydrolysis of a vinyl acetate/ethenesulfonate copolymer, (degree of hydrolysis: 97.1%, Na ethenesulfonate content: 5.2% by weight (=3.2% by weight of $SO_3^-$), viscosity of the 4% strength by weight aqueous solution at 20° C.: 5.7 cP) are dissolved in 560 g of water at 90° C. under an $N_2$ atmosphere in a reaction vessel with a stirrer and reflux condenser. The solution is then cooled to 1° C., 7.46 g of 85% strength by weight phosphoric acid are added and 73 g of n-butyraldehyde are metered in over a period of 2 hours such that the temperature of the mixture does not exceed 2.5° C. The mixture is then warmed to 30° C. in the course of 3 hours and the reaction mixture is subsequently allowed to after-react at 30° C. for 2 hours. A further 105 g of the abovementioned polyvinyl alcohol containing ethenesulfonate units are then dissolved in the resulting dispersion at 60° C. The mixture is cooled to 10° C., 3.73 g of 85% strength by weight phosphoric acid are added and 54.75 g of n-butyraldehyde are then metered in over a period of 2 hours such that the temperature does not rise above 12° C. The mixture is then warmed to 30° C. in the course of 3 hours and subsequently stirred at this temperature for a further 2 hours. Thereafter, the mixture is brought to a pH of 6.25 by addition of aqueous NaOH. The stable aqueous dispersion of plastic thereby obtained has a solids content of 34.8% by weight and a viscosity of 75.1 cP (determined in a rotary viscometer[6] at 20° C. and a shear rate of 386.6 $s^{-1}$). The average particle diameter of the dispersion is 1.05 $\mu m^{5)}$. The minimum film-forming temperature (MFT) of the dispersion is above 50° C. The dispersion contains no low molecular weight emulsifiers or surfactants.

[5] Determined by argon/xenon laser aerosol spectroscopy.
[6] Rotary viscometer from Haake, type VT 500.

A portion of the polyvinyl butyral obtained in the form of a dispersion is isolated in the form of a colorless powder by freeze drying an aliquot portion. The powder comprises divinyl butyral units[2] to the extent of 73.9% by weight, vinyl alcohol units[1] to the extent of 20.8% by weight, Na ethenesulfonate units[3] to the extent of 3.7% by weight and vinyl acetate units[4] to the extent of 1.6% by weight.

[1] [2] [3] Calculated by means of the $SO_3^-$ content of the starting polyvinyl alcohols and the residual vinyl acetate content of the acetals determined by analysis, assuming a 100% aldehyde conversion. (The residual butyraldehyde content of the dispersion was determined as <0.2% by weight in all cases by means of gas chromatography analysis (GC)).
[4] Determined by hydrolysis of the vinyl acetate units with excess alkali and back-titration.

Example 4

112 g of a polyvinyl alcohol containing ethenesulfonate units, prepared by hydrolysis of a vinyl acetate/ethenesulfonate copolymer, (degree of hydrolysis: 95.5%, Na ethenesulfonate content: 10.2% by weight (=6.3% by weight of $SO_3^-$), viscosity of the 4% strength by weight aqueous solution at 20° C.: 4.8 cP) and 28 g of commercially available polyvinyl alcohol which is free from sulfonate groups (®Mowiol 4-98 from Hoechst AG, viscosity of the 4% strength by weight aqueous solution at 20° C.: 4 cP, degree of hydrolysis: 98%) are dissolved in 560 g of water at 90° C. under an $N_2$ atmosphere in a reaction vessel with a stirrer and reflux condenser. The $SO_3^-$ content of the anhydrous polyvinyl alcohol mixture is 5% by weight. The solution is then cooled to 1° C., 6.44 g of 85% strength by weight phosphoric acid are added and 68.6 g of n-butyraldehyde are metered in over a period of 2 hours such that the temperature of the mixture does not exceed 2.5° C. The mixture is then warmed to 30° C. in the course of 3 hours and the reaction mixture is subsequently allowed to after-react at 30° C. for 2 hours. The mixture is then brought to a pH of 6.5 by addition of aqueous NaOH.

The stable aqueous dispersion of plastic thereby obtained has a solids content of 24.7% by weight and a viscosity of 38.5 cP (determined in a rotary viscometer[6] at 20° C. and a shear rate of 386.6 s$^{-1}$). The average particle diameter of the dispersion is 0.8 μm[5]. The minimum film-forming temperature (MFT) of the dispersion is 23° C. The dispersion contains no low molecular weight emulsifiers or surfactants.

[5] Determined by argon/xenon laser aerosol spectroscopy.
[6] Rotary viscometer from Haake, type VT 500.

A portion of the polyvinyl butyral obtained in the form of a dispersion is isolated in the form of a colorless powder by freeze drying an aliquot portion. The powder comprises divinyl butyral units[4] to the extent of 70.7% by weight, vinyl alcohol units[1] to the extent of 21.8% by weight, Na ethenesulfonate units[3] to the extent of 6.0% by weight and vinyl acetate units[2] to the extent of 1.5% by weight.

[1] [2] [3] Calculated by means of the $SO_3^-$ content of the starting polyvinyl alcohols and the residual vinyl acetate content of the acetals determined by analysis, assuming a 100% aldehyde conversion. (The residual butyraldehyde content of the dispersion was determined as <0.2% by weight in all cases by means of gas chromatography analysis (GC)).
[4] Determined by hydrolysis of the vinyl acetate units with excess alkali and back-titration.

The viscosity of the 10% strength by weight ethanolic polyvinyl butyral solution prepared from the pulverulent polymer is 68.5 cP (determined in a Höppler viscometer in accordance with DIN 53015 at 20° C.).

The pulverulent product is redispersible in water to form a stable aqueous dispersion.

Example 5

1120 g of a polyvinyl alcohol containing ethenesulfonate units, prepared by hydrolysis of a vinyl acetate/ethenesulfonate copolymer, (degree of hydrolysis: 96.7%, Na ethenesulfonate content: 10.2% by weight (=6.3% by weight of $SO_3^-$), viscosity of the 4% strength by weight aqueous solution at 20° C.: 4.4 cP) and 280 g of commercially available polyvinyl alcohol which is free from sulfonate groups (®Mowiol 4-98 from Hoechst AG, viscosity of the 4% strength by weight aqueous solution at 20° C.: 4 cP, degree of hydrolysis 98%) are dissolved in 5600 g of water at 90° C. under an $N_2$ atmosphere in a reaction vessel with a stirrer and reflux condenser. The $SO_3^-$ content of the anhydrous polyvinyl alcohol mixture is 5% by weight. The solution is then cooled to 1° C., 66 g of 85% strength by weight phosphoric acid are added and 721 g of n-butyraldehyde are metered in over a period of 2 hours such that the temperature of the mixture does not exceed 2.5° C. The mixture is then warmed to 37° C. in the course of 3 hours and the reaction mixture is subsequently allowed to after-react at 37° C. for 2 hours. The mixture is then brought to a pH of 6.5 by addition of aqueous NaOH. The stable aqueous dispersion of plastic thereby obtained has a solids content of 22.78% by weight and a viscosity of 187 cP (determined in a rotary viscometer[6] at 20° C. and a shear rate of 386.6 s$^{-1}$). The average particle diameter of the dispersion is 0.88 μm[5]. The minimum film-forming temperature (MFT) of the dispersion is 11° C. The dispersion contains no low molecular weight emulsifiers or surfactants.

[5] Determined by argon/xenon laser aerosol spectroscopy.
[6] Rotary viscometer from Haake, type VT 500.

A portion of the polyvinyl butyral obtained in the form of a dispersion is isolated in the form of a colorless powder by freeze drying an aliquot portion of the dispersion. The powder comprises divinyl butyral units[4] to the extent of 73.3% by weight, vinyl alcohol units[1] to the extent of 19.3% by weight, Na ethenesulfonate units[3] to the extent of 5.9% by weight and vinyl acetate units[2] to the extent of 1.5% by weight.

[1] [2] [3] Calculated by means of the $SO_3^-$ content of the starting polyvinyl alcohols and the residual vinyl acetate content of the acetals determined by analysis, assuming a 100% aldehyde conversion. (The residual butyraldehyde content of the dispersion was determined as <0.2% by weight in all cases by means of gas chromatography analysis (GC)).
[4] Determined by hydrolysis of the vinyl acetate units with excess alkali and back-titration.

The viscosity of the 10% strength by weight ethanolic polyvinyl butyral solution prepared from the pulverulent polymer is 69.0 cP (determined in a Höppler viscometer in accordance with DIN 53015 at 20° C.).

The pulverulent product is redispersible in water to form a stable aqueous dispersion.

Example 6

980 g of a polyvinyl alcohol containing ethenesulfonate units, prepared by hydrolysis of a vinyl acetate/ethenesulfonate copolymer, (degree of hydrolysis: 96.7%, Na ethenesulfonate content: 10.2% by weight (=6.3% by weight of $SO_3^-$), viscosity of the 4% strength by weight aqueous solution at 20° C.: 4.4 cP) and 420 g of commercially available polyvinyl alcohol which is free from sulfonate groups (®Mowiol 4-98 from Hoechst AG, viscosity of the 4% strength by weight aqueous solution at 20° C.: 4 cP, degree of hydrolysis: 98%) are dissolved in 5600 g of water at 90° C. under an $N_2$ atmosphere in a reaction vessel with a stirrer and reflux condenser. The $SO_3^-$ content of the anhydrous polyvinyl alcohol mixture is 4.4% by weight. The solution is then cooled to 1° C., 66 g of 85% strength by weight phosphoric acid are added and 733 g of n-butyraldehyde are metered in over a period of 2 hours such that the temperature of the mixture does not exceed 2.5° C. The mixture is then warmed to 37° C. in the course of 3 hours and the reaction mixture is subsequently allowed to after-react at 37° C. for 2 hours. The mixture is then brought to a pH of 6.5 by addition of aqueous NaOH. The stable aqueous dispersion of plastic thereby obtained has a solids content of 23.68% by weight and a viscosity of 19 cP (determined in a rotary viscometer[6] at 20° C. and a shear rate of 386.6 s$^{-1}$). The average particle diameter of the dispersion is 1.1 μm[5]. The minimum film-forming temperature (MFT) of the dispersion is 8° C. The dispersion contains no low molecular weight emulsifiers or surfactants.

[5] Determined by argon/xenon laser aerosol spectroscopy.
[6] Rotary viscometer from Haake, type VT 500.

A portion of the polyvinyl butyral obtained in the form of a dispersion is isolated in the form of a colorless powder by freeze drying an aliquot portion of the dispersion. The powder comprises divinyl butyral units[4] to the extent of 74.1% by weight, vinyl alcohol units[1] to the extent of 19.2% by weight, Na ethenesulfonate units[3] to the extent of 5.1% by weight and vinyl acetate units[2] to the extent of 1.5% by weight.

[1] [2] [3] Calculated by means of the $SO_3^-$ content of the starting polyvinyl alcohols and the residual vinyl acetate content of the acetals determined by analysis, assuming a 100% aldehyde conversion. (The residual butyraldehyde content of the dispersion was determined as <0.2% by weight in all cases by means of gas chromatography analysis (GC)).
[4] Determined by hydrolysis of the vinyl acetate units with excess alkali and back-titration.

The viscosity of the 10% strength by weight ethanolic polyvinyl butyral solution prepared from the pulverulent polymer is 58.5 cP (determined in a Höppler viscometer in accordance with DIN 53015 at 20° C.).

The pulverulent product is redispersible in water to form a stable aqueous dispersion.

We claim:

1. A process for the preparation of a polyvinyl acetal with, in amounts sufficient to form a dispersion, sulfo salt groups with a $—SO_3$ content or an emulsifier-free aqueous dispersion thereof and its aqueous emulsifier-free dispersion by acetalization of a polyvinyl alcohol (PVAL) with an aldehyde or aldehyde acetal under acid catalysts in an aqueous medium comprising reacting a copolymeric PVAL containing comonomer units carrying sulfo salt groups in an amount sufficient to form a dispersion, or a mixture thereof, capable of forming a dispersion, with a PVAL free from sulfo salt groups with the stoichiometrically required amount of an aldehyde or an aldehyde acetal in aqueous solution with addition of an acid catalyst under acetalization conditions in the absence of a low molecular weight emulsifier or surfactant to form a stable aqueous polyvinyl acetal dispersion, and recovering the resulting dispersion, or isolating the polymer content of the resulting aqueous dispersion in a dry, water-redispersible powder form by removal of water.

2. The process of claim 1 wherein the sulfonate groups are in the form of their alkali metal or ammonium or amine salt.

3. The process of claim 1 wherein the $—SO_3^-$ content from the sulfo salt groups in the copolymeric starting PVAL on which the polyvinyl acetal is based or a mixture thereof with a PVAL free from sulfo salt groups being at least 1.5% by weight of $—SO_3^-$, based on the weight of the anhydrous copolymeric starting PVAL containing sulfo salt groups, or an anhydrous mixture thereof with a PVAL free from sulfo salt groups.

4. The process of claim 1 wherein the starting PVAL containing sulfo salt groups on which the polyvinyl acetal is based being obtained by hydrolysis or alcoholysis of a copolymeric hydrolyzable polyvinyl ester containing comonomer units carrying sulfonate groups, and optionally a mixture thereof with a hydrolyzable polyvinyl ester free from sulfonate groups to a degree of hydrolysis of at least 70 mol %, based on the number of moles of hydrolyzable vinyl ester units in the starting polyvinyl ester, the degree of acetalization of the polyvinyl acetal is up to 86 mol %, based on the total number of moles of acetalizable vinyl alcohol units in the starting PVAL, and the viscosity of the 4% strength by weight aqueous starting PVAL solutions being in the range from 2 to 100 cP, determined in a Hoppler viscometer in accordance with DIN 53015 at 20° C.

5. The process of claim 1 wherein the copolymeric starting PVAL carrying sulfo salt groups on which the polyvinyl acetal is based, or a mixture thereof with a PVAL free from sulfo salt groups, being obtained by hydrolysis or alcoholysis of a copolymeric hydrolyzable polyvinyl ester which additionally contains up to 10 mol % in total, based on the copolymeric starting polyvinyl ester, of other comonomer units selected from the group consisting of copolymerizable ethylenically unsaturated ($C_3$–$C_{18}$) carboxylic acids and dicarboxylic acids and anhydrides thereof, acrylic acid ($C_1$–$C_{18}$) esters, methacrylic acid ($C_1$–$C_{18}$) esters, ($C_2$–$C_8$)-α-olefins, other further vinyl ($C_1$–$C_{18}$) carboxylic acid esters, ethylenically unsaturated ($C_3$–$C_{18}$) carboxylic acid amides and nitriles, vinyl halides, vinylidene halides, vinylbenzenes, vinylpyridines and vinylpyrrolidones.

6. The process of claim 1 wherein the starting PVAL containing sulfo salt groups on which the polyvinyl acetal is based comprises a mixture of PVAL containing sulfo salt groups and a PVAL which is free from sulfo salt groups, the content of PVAL sulfo salt groups being more than 25% by weight, based on the PVAL starting mixture.

7. The process of claim 1 wherein the content of vinyl alcohol units in the starting PVAL on which the polyvinyl acetal is based being more than 50 mol %, based on the total number of moles of all the monomer units in the starting PVAL.

8. The process of claim 1 wherein the content of non-acetalized vinyl alcohol units in the polyvinyl acetal is 15 to 35% by weight, based on the polyvinyl acetal.

9. The process of claim 1 wherein the polyvinyl acetal is prepared by acetalization of the starting PVAL or starting PVAL mixture on which the product is based in aqueous solution with addition of an acid catalyst selected from the group consisting of hydrochloric acid, sulfuric acid, nitric acid and phosphoric acid, with a ($C_1$–$C_{20}$) aliphatic, ($C_6$–$C_{20}$) aromatic, ($C_7$–$C_{20}$) araliphatic or ($C_5$–$C_{20}$) cycloaliphatic aldehyde, optionally substituted by hydroxyl or halogen atoms, and the polyvinyl acetal being obtained in the form of an aqueous dispersion or, after elimination of the water content from the dispersion, in a solid, redispersible powder form.

10. The process of claim 1 wherein the polyvinyl acetal is in the form of an aqueous dispersion of plastic containing no low molecular weight emulsifier or surfactant and having a solids content of up 60% by weight, based on the aqueous dispersion, and wherein the average particle diameter of polymer is in the range from 0.1 to 3 μm.

11. The process of claim 1 wherein the polyvinyl acetal is in the form of a finely divided redispersible powder prepared from an aqueous polyvinyl acetal dispersion by removal of water.

12. The process as claimed in claim 1, wherein n-butyraldehyde is employed as the aldehyde.

13. The process of claim 1 wherein the polyvinyl acetal is plasticized by addition of plasticizer.

14. The process of claim 1 wherein the polyvinyl acetal is comprises up to 40% by weight, based on the polyvinyl acetal, of a plasticizer selected from the group consisting of diesters of di-, tri- or tetraethylene glycol with aliphatic ($C_6$–$C_{10}$) carboxylic acids, diesters of ($C_2$–$C_{12}$) dicarboxylic acids, with aliphatic ($C_4$–$C_{10}$) alcohols and esters of fatty acids having a total of up to 40 carbon atoms.

* * * * *